Oct. 2, 1956   W. C. BRIGGS ET AL   2,765,198
HYDRAULIC BARKER
Filed March 9, 1953   8 Sheets-Sheet 1

INVENTOR.
William C. Briggs
Marion Fish
BY

INVENTOR.
William C. Briggs
Marion Fish
BY
Cook & Robinson
ATTORNEYS

INVENTOR.
William C. Briggs
Marion Fish
BY Cook & Robinson
ATTORNEYS

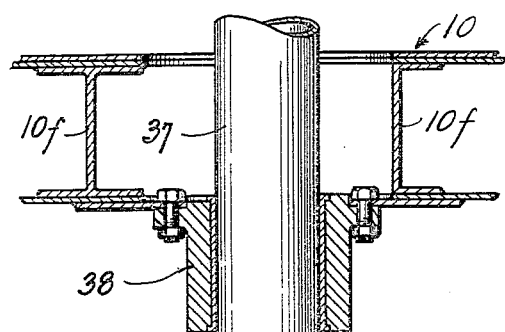
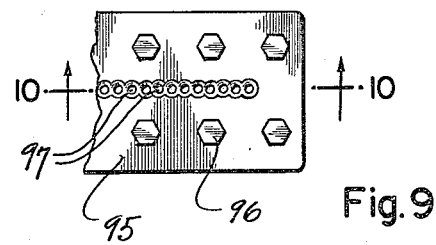
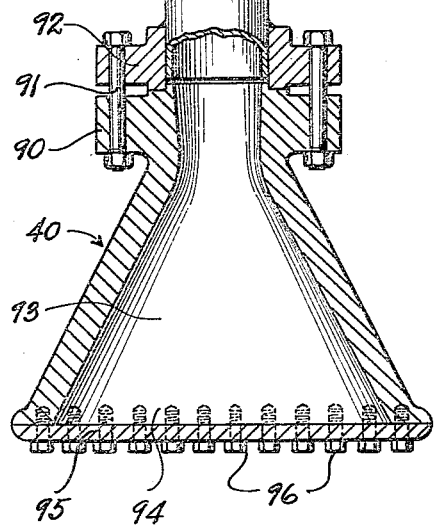
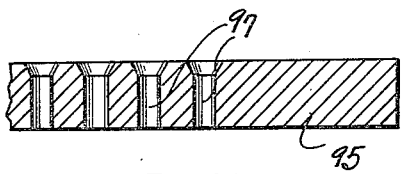
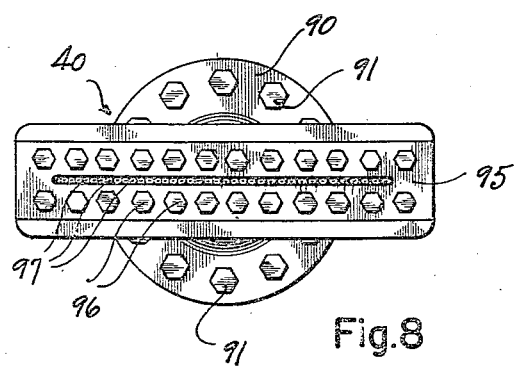

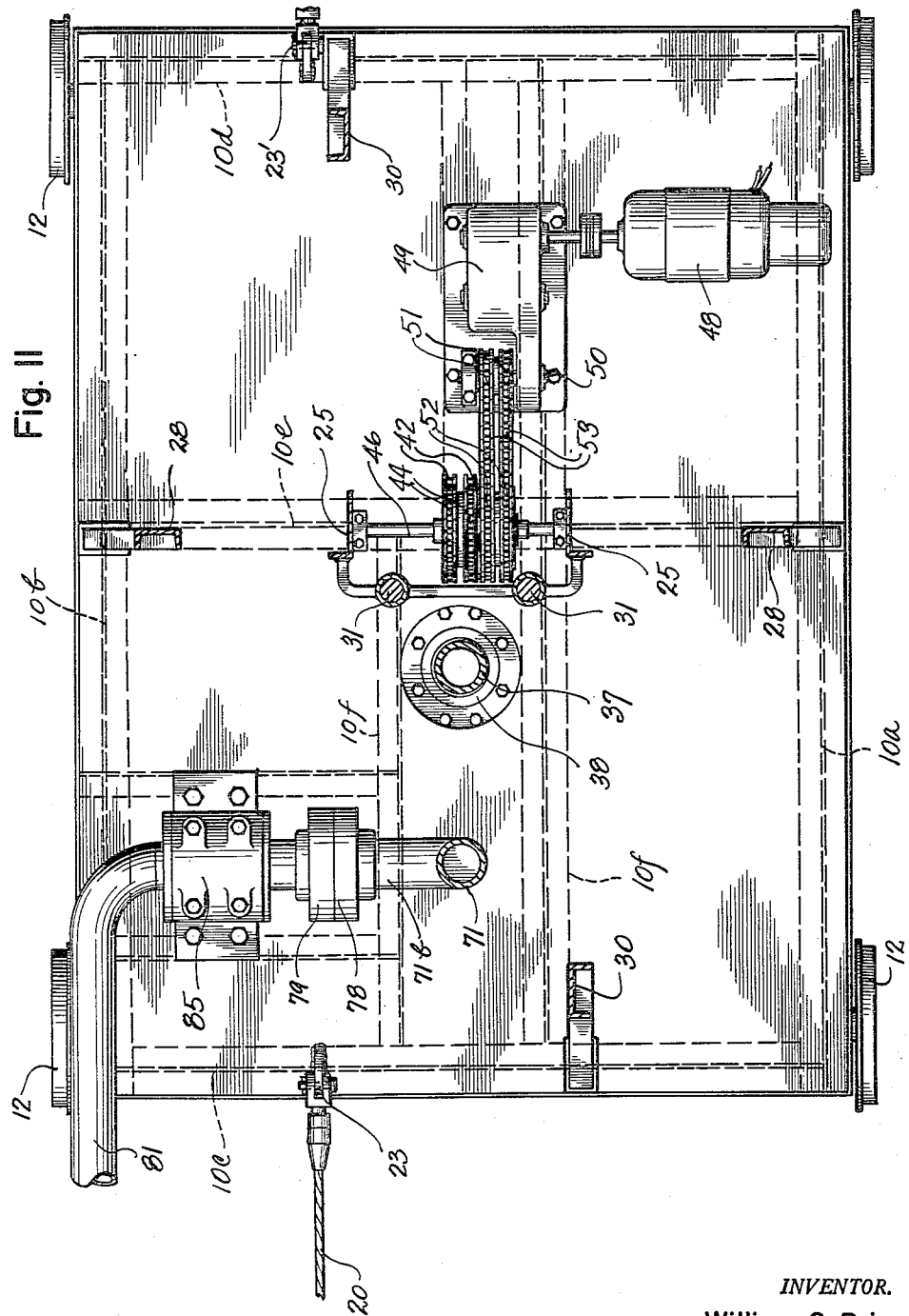

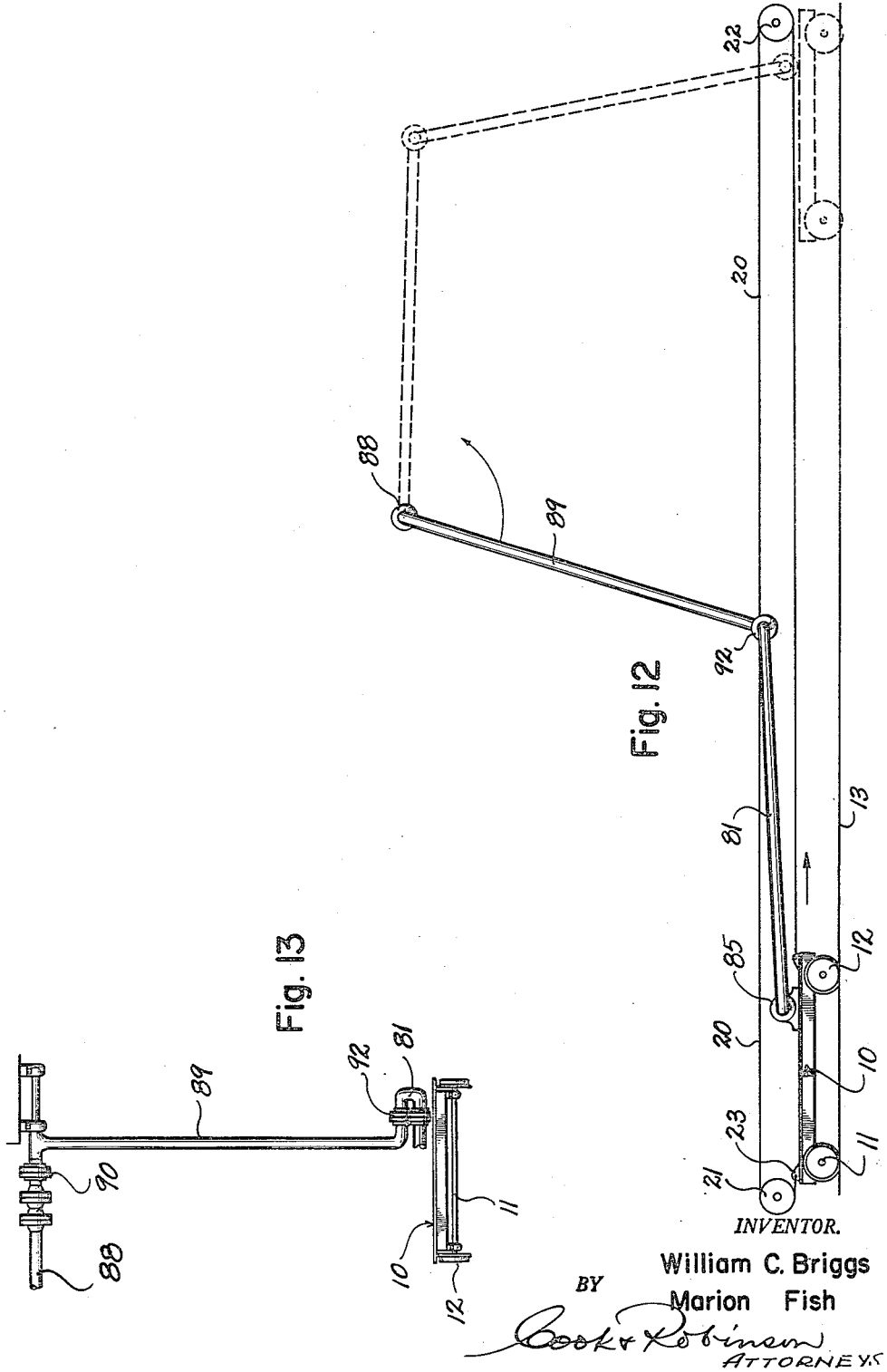

United States Patent Office 2,765,198
Patented Oct. 2, 1956

2,765,198

HYDRAULIC BARKER

William C. Briggs, Everett, and Marion F. Fish, Woodinville, Wash., assignors to Sumner Iron Works, Everett, Wash.

Application March 9, 1953, Serial No. 341,194

3 Claims. (Cl. 299—62)

This invention relates to log barking apparatus and it has reference more particularly to what are known in the logging industry as "hydraulic barkers"; such barkers being characterized by the use of nozzles for directing jets of water under high pressure against the log to effect the removal of the bark therefrom. Furthermore, the invention has to do with improvements in traveling apparatus designed for the hydraulic barking of logs that may range from one and one-half to six or more feet in diameter and up to forty or more feet in length and by reason of this travel requiring considerable flexibility in the water delivery conduits that connect the nozzle with a stationary source of supply of water.

It is the principal object of the present invention to provide a hydraulic log barking apparatus, mounted on a carriage that is reciprocally movable along a trackway beneath which devices are provided whereby a log may be rotatably supported, and which apparatus includes a nozzle, to which water is supplied under the required high pressure, and which can be adjustably positioned to discharge jets of water therefrom against the log; this particular invention being characterized by the particular manner of use therein of hingedly or swingingly joined lengths of metal pipe as the means for connecting the movably mounted nozzle with the source of supply of water under pressure as distinguished from the flexible hose or tubing that is usually used for this purpose.

It is a further object of the present invention to provide a hydraulic barker having a nozzle head from which a multiplicity of water jets may be discharged and which head is mounted at the lower end of a vertically disposed body tube that can be adjusted endwise to locate the nozzle head at any desired and/or proper spacing from the log regardless of its diameter, and which body tube also is rotatably adjustable in order that the application of the water jets, as discharged from the nozzle head against the log can be changed as may be required for most effective results in consideration of the kind, or character of the log.

Further objects and advantages of the invention reside in novel features of construction of the nozzle and in the specific mechanisms employed for effecting its rotary and vertical adjustment; in the use of hingedly joined, rigid metal tubes of substantial length in providing articulated conduits for the conduction of water under pressure from its source of supply to the nozzle; and in the specific means for and manner of joining the metal tubes to permit their elbow-like hinging or swinging action and provide the necessary flexibility for nozzle adjustment and for reciprocal travel of the carriage; and in the disposition of the hinged pipes for clearance and maximum travel of the carriage.

In accomplishing the above mentioned and other objects of the invention, we have provided the improved details of construction, the preferred forms of which are illustrated in the accompanying drawings, wherein—

Fig. 7 is a longitudinal sectional view of the nozzle head and a portion of its mounting tube, taken on the line 7—7 in Fig. 2.

Fig. 8 is a lower end view of the nozzle head; particularly showing the removable end plate.

Fig. 9 is an enlarged face view of a part of the nozzle head end plate.

Fig. 10 is an enlarged sectional detail taken on line 10—10 in Fig. 9, showing the perforations in the nozzle head end plate for the formation of water jets.

Fig. 11 is a horizontal section taken on line 11—11 in Fig. 3 showing details of the carriage construction in plan view.

Fig. 12 is an elevation showing the hinging action of the articulated conduit leading to the carriage from the source of supply of water under pressure.

Fig. 13 is an end view of the same parts.

Referring more in detail to the drawings—

Figure 1:
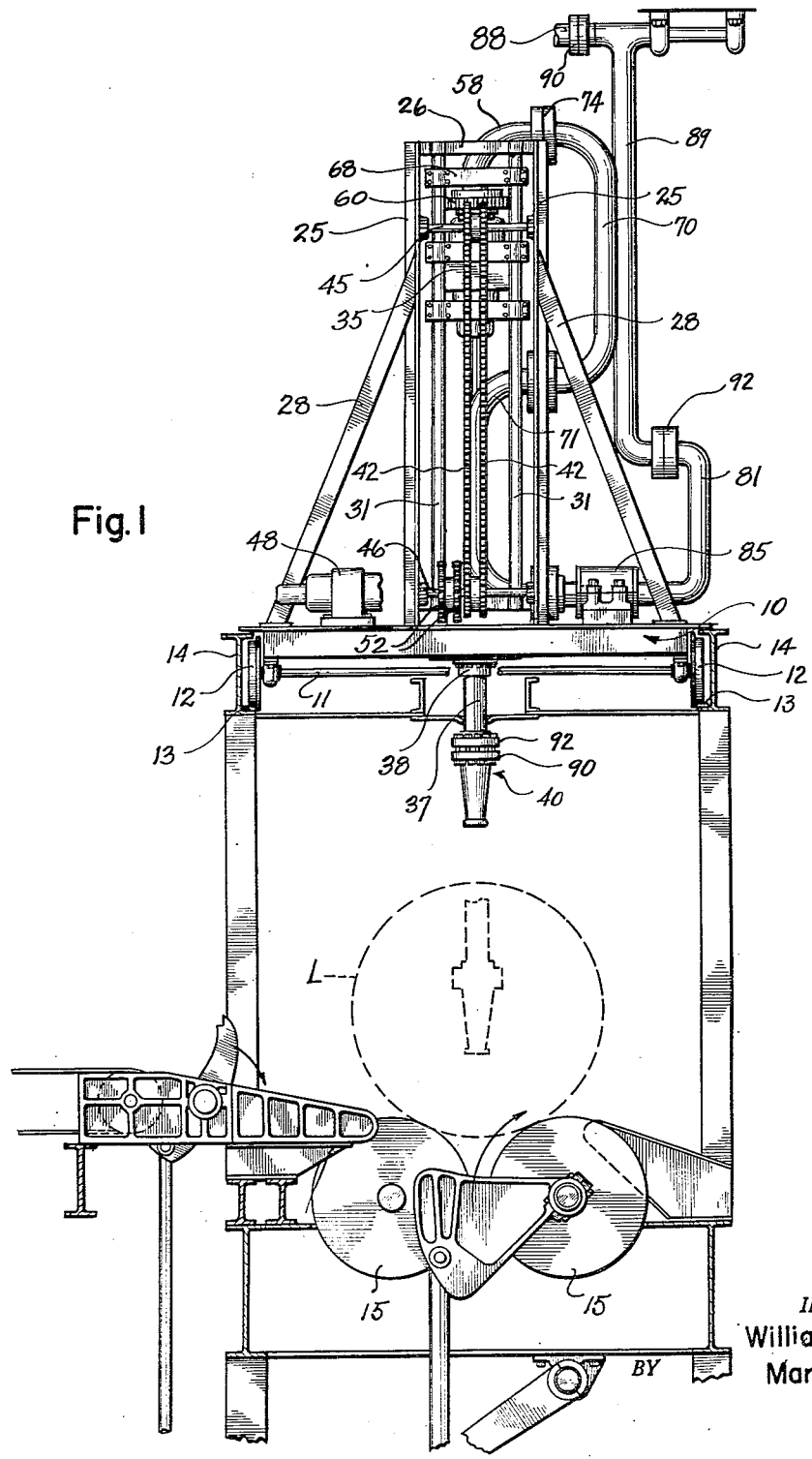
Fig. 1 is an end elevation of the present hydraulic log barking mechanism, as seen when looking in the direction of arrow 1 in Fig. 2, and showing its position above and relative to the log from which bark is to be removed.
Figure 3:
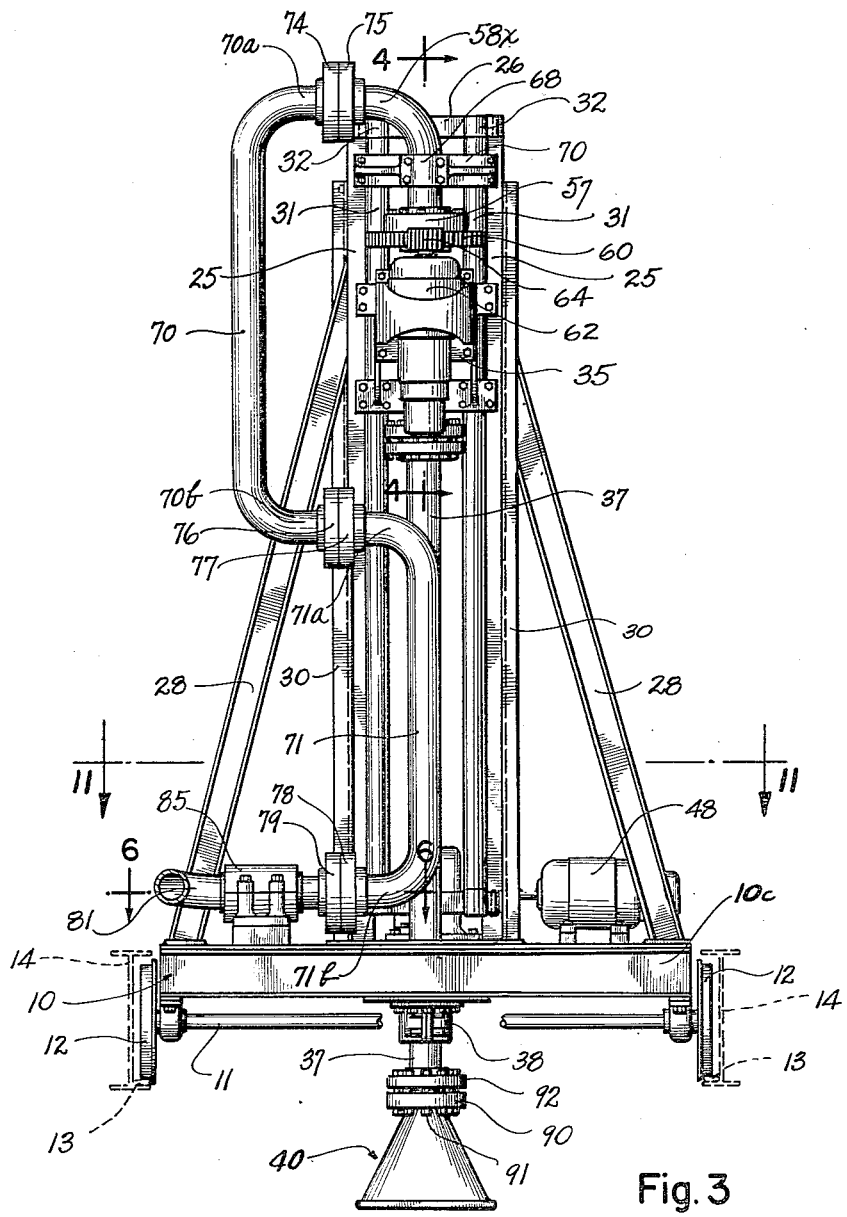
Fig. 3 is an end elevation of the barking apparatus, as seen when looking in the direction of arrow 3 in Fig. 2, and showing also a transverse section of the track along which the carriage operates.

The present log barking apparatus is mounted on a carriage which is arranged for easy back and forth travel upon a straight, horizontal trackway as indicated in Fig. 12; the trackway being somewhat longer than the logs of maximum length that are to be barked. The carriage is herein designated in its entirety by reference numeral 10, and it is shown to comprise cross-axles 11—11 at its opposite ends which are equipped, at their ends, with wheels 12. These wheels are shown to be flanged for guided travel on parallel track forming rails 13—13 which, as best shown in Fig. 3, are fixed longitudinally upon the lower inside flanges of parallel I-beams 14—14, or the like, that extend in transversely spaced relationship along and above the level of log mounting and turning rolls 15—15 seen in Figs. 1.

The mechanical devices associated with the rolls 15—15 for effecting their rotation as a means for axially turning a log that may be supported thereon, are not shown in detail in the drawings, as they form no novel part of the present invention. It is to be understood, however, that such devices, and also the means for positioning a log L, on the log turning rolls 15—15, and for its removal therefrom may be of any suitable kind consistent with the present apparatus and its mode of operation.

The present preferred means for reciprocally moving the carriage 10 along the trackway comprises a cable 20; this being associated with the carriage as best shown in Fig. 12. The cable extends parallel with the track, over the carriage and about cable drums 21—22 that are properly mounted at opposite ends of the trackway. At its opposite ends, the cable is connected as shown at 23 and 23' in Figs. 11 and 12, to opposite ends of the carriage. Suitable means, not herein shown, is provided for driving one or both of the drums as a means of causing travel of the cable and movement of the barker in the direction desired and at the rate of travel best suited for the particular barking operation.

The carriage 10, as best shown in Fig. 11, comprises a rectangular, horizontally disposed frame structure, made up of opposite side beams 10a—10b and opposite end beams 10c—10d; these beams in turn being joined by various cross-bears 10e and longitudinal beams 10f in such manner as to provide a substantial and rigid carriage frame.

Erected upon the carriage 10 in its longitudinal center line is an upright frame structure comprising two transversely spaced, vertical angle iron posts, 25—25, fixed at their lower ends to a cross beam 10e of the horizontal base frame 10, and joined across their upper end portions by a cross-beam 26. This upright frame is braced against lateral strain by oppositely inclined brace beams 28—28, best shown in Fig. 3, and is likewise braced against forward and rearward strain by the oppositely inclined brace beams 30—30, seen best in Fig. 2. The various brace beams are fixed at their upper ends to the upright frame, and at their lower ends are fixed to the horizontal frame 10.

Figure 4:
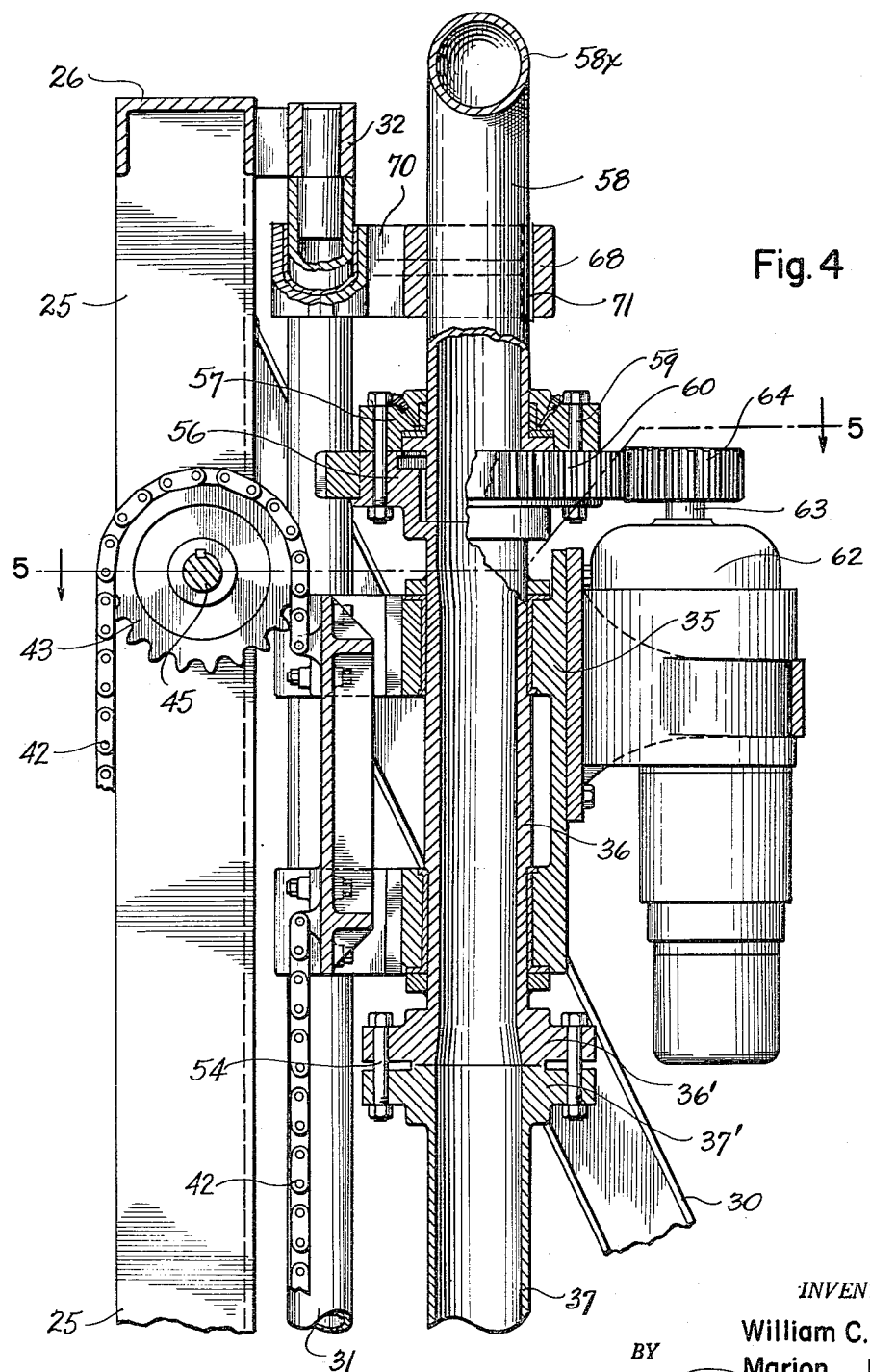
Fig. 4 is an enlarged, vertical section, taken on line 4—4 in Fig. 3, showing the cross-head which carries the nozzle and the means for effecting rotative adjustment of the nozzle.
Figure 5:
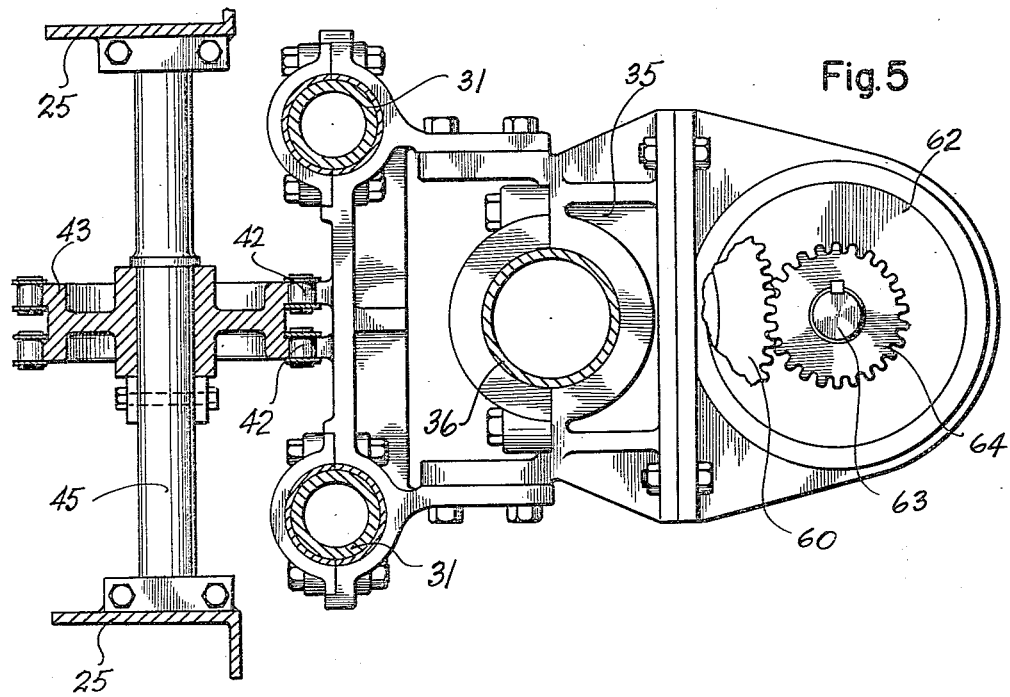
Fig. 5 is a horizontal section on line 5—5 in Fig. 4.

Supported vertically at what will be referred to as the forward side of the upright frame, are two laterally spaced guide tubes 31—31. These tubes are held at their upper ends in bearings 32—32, fixed to the upper end of the upright frame structure, and at their lower ends are similarly held in bearings 33—33 mounted on the lower end portion of the upright frame structure. These guide tubes are equally spaced from and located at opposite sides of the central longitudinal plane of the carriage, as seen in Figs. 3 and 11, and mounted thereon, for vertical sliding movement therealong, is a heavy and substantial cross-head 35; this being shown to be equipped with four bearings wherein the guide tubes are slidably contained. Mounted in the cross head 35 for axial rotation, but held against longitudinal movement therein is a vertically disposed cylindrical section of water pipe 36. This extends at its ends beyond the upper and lower ends of the cross-head and at its lower end, as seen in Fig. 4, it is joined with a longer and continuing pipe section 37. The pipe section 37 is vertically disposed and projects through and is slidably contained in a bearing 38 that is fixed in the horizontal carriage frame 10 as shown in Fig. 3.

Mounted on the lower end of the pipe section 37 is a nozzle head, embodying novel features, designated in its entirety by numeral 40. Water, as supplied through the pipes 36 and 37 to the nozzle head under high pressure, may be directed against the log for the removal of its bark. Water is supplied to the upper end of pipe 36 through an articulated conduit comprising hingedly joined pipe sections arrayed in a manner presently to be described in detail.

For purpose of explanation and claiming this invention, the nozzle will be considered to comprise the body tube made up of pipes 36 and 37, and the nozzle head 40 as applied to tube 37. The means for effecting the vertical adjustment of the nozzle as supported by the cross-head 35, for the purpose of changing the spacing of the head 40 from the log as may be required to accommodate the operation to logs of different diameter, is shown in Figs. 1, 2, 4 and 11 to comprise a pair of vertically operating chain belts 42—42 that are mounted for travel at upper and lower ends respectively about sprocket wheels 43—43 and 44—44; these wheels being rotatably supported by cross-shafts 45 and 46 extended between and supported by the vertical posts 25—25. The chain belts 42—42 are parallel to the direction of travel of the cross-head 35 and as seen in Fig. 4, are fixed at their opposite ends to the cross-head 35 for effecting its movement along the guide tubes 31—31. Mounted on the carriage, as shown in Figs. 3 and 11, is an electric motor 48 which, through a suitable gear reduction designated generally at 49, drives a shaft 50 which mounts a pair of sprocket wheels 51—51 thereon; these wheels being aligned with similar sprocket wheels 52—52 fixed on the cross shaft 46. Sprocket chain belts 53 operate about these aligned sprocket wheels thus to drive the shaft 46 and the sprocket wheels 44—44 about which the lower ends of the chain belts 42—42 operate. With the travel of the belts 42—42 the crosshead 35 will be raised or lowered along the guide tubes 31—31, moving the pipes 36—37 therewith to adjust the elevation of the nozzle accordingly; the range of adjustment being indicated in Fig. 1.

It is shown in Fig. 4 that the adjacent ends of pipes 36 and 37 have flanges, 36' and 37' welded or otherwise secured thereto and bolts 54 are passed through these flanges to join the pipes together in a water sealed, pressuretight joint. Likewise, it is shown that the pipe 36 is equipped at its upper end with a flange 56 that is fitted to a similar flange 57 or collar that rotatably contains the lower end portion of an elbow section of water supply pipe 58 and these flanges 56 and 57 are joined by bolts 59 to effect a sealed, pressuretight joint that permits relative rotation of pipes 36 and 58. The flange 56 of pipe 36 is circumferentially shouldered and mounts the nozzle turning gear wheel 60 thereon.

Mounted on the cross-head 35 is an electric motor 62 that drives a vertical shaft 63 carried therewith and on which shaft a pinion gear 64 is fixed in operative mesh with the nozzle turning gear wheel 60, as a means for rotatably adjusting the joined pipes 36 and 37 constituting the nozzle body tube and for correspondingly rotating the nozzle head 40 carried on the lower end of pipe 37.

Figure 2:
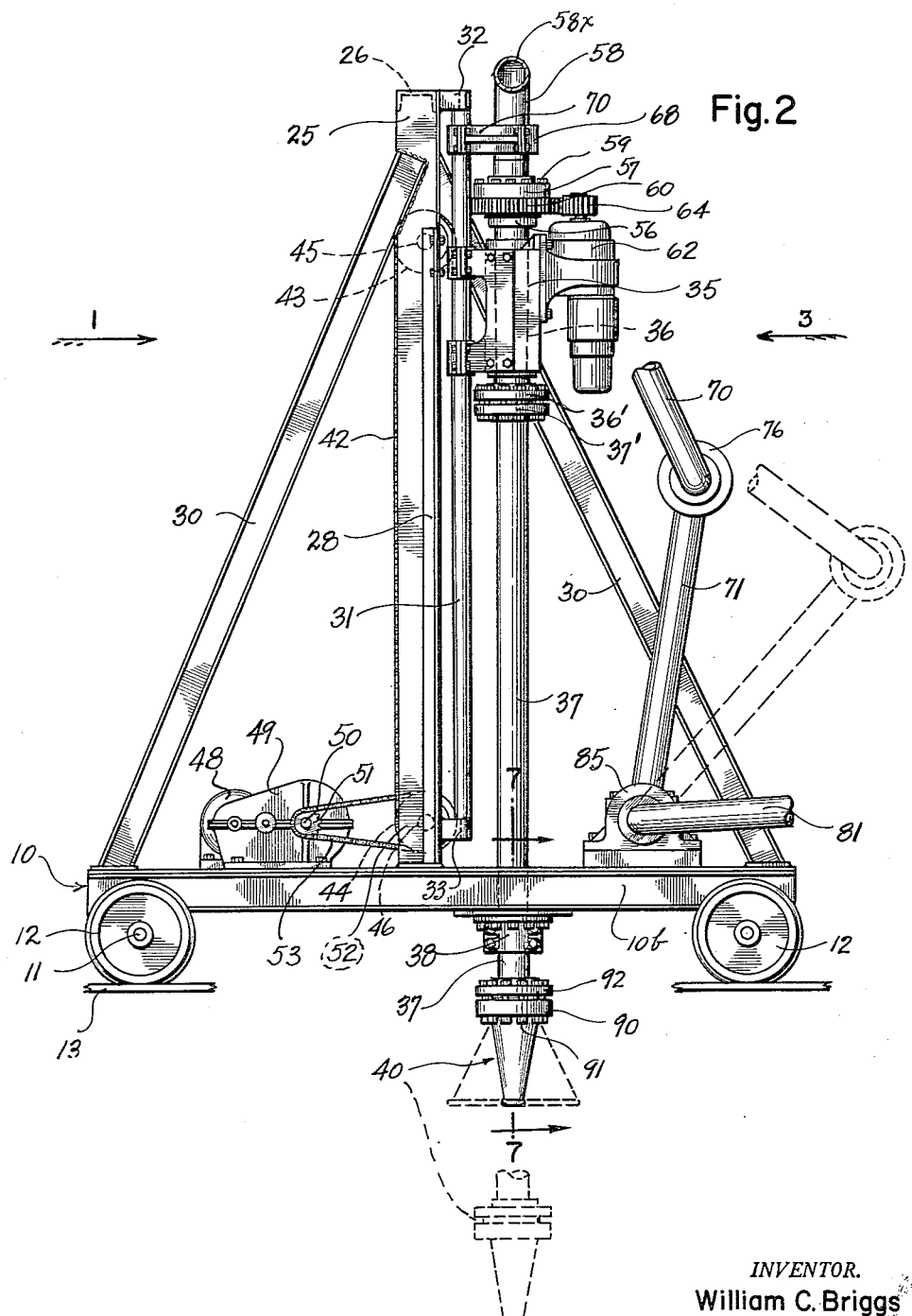
Fig. 2 is a side view of the log barker, indicating in dotted lines, the lower limit of the vertical adjustment of the nozzle head, and showing the elbow action of the joined sections of water pipe mounted on the carriage and connected to the nozzle.

It is shown in Figs. 2, 3 and 4 that the vertical portion of the elbow pipe section 58 is contained, immediately above its connection with pipe 36, in a bearing 68 formed on a cross-head 70 that is mounted at its ends on the vertical guide tubes 31—31. This part of the pipe 58 is keyed as at 71 in Fig. 4, against turning in bearing 68, but the cross-head 70 is free to move up and down on the guide tubes in accordance with the movement of the cross-head 35 as effected by travel of the chain belts 42.

The pipe 58, as seen in Fig. 3, is in the form of an elbow and has a laterally turned end portion 58x connected at its outer end to one end of a special section of the water supply line. This special section of the supply line is referred to as an articulated conduit and it comprises the two hingedly joined lengths of pipe, designated respectively by reference numerals 70 and 71, well shown in Figs. 2 and 3. These two pipes 70 and 71 are substantially equal in length, and each has its opposite end portions turned laterally in an easy curve at a 90° angle in the same direction. The laterally turned upper end portion 70a of pipe 70 is shown in Fig. 3 to be equipped with a flange 74 that is bolted to a collar 75 that rotatably contains the laterally turned upper end portion of the elbow pipe section 58 therein in a water sealed and pressure tight joint. The lower, laterally turned end 70b of pipe section 70, likewise, is equipped with a flange 76 that is bolted to a collar 77 in which the laterally turned upper end portion 71a of pipe 71 is rotatably secured in a pressure tight connection. Also, the laterally turned lower end portion 71b of pipe 71 is formed with a flange 78 that is secured to a collar 79 by bolts 80, in which collar an end portion 81x of a water supply pipe 81 is rotatably contained in a secure and pressure tight connection as has been shown in Fig. 6.

With the pipe sections 70 and 71 of this articulated conduit thus joined to each other and the upper end of pipe 70 swingingly joined, as described, to pipe 58, it is possible for the cross-heads 35 and 70 to be moved vertically along the guides 31—31 to raise and lower the nozzle accordingly and to make this adjustment without disrupting the water delivery connection between pipes 81, 70-71 and 58. In this vertical movement of the pipe section 58, the two pipes 70 and 71 merely adjust themselves with elbow-like action between the full line and dotted line positions in which they are shown in Fig. 2.

Figure 6:
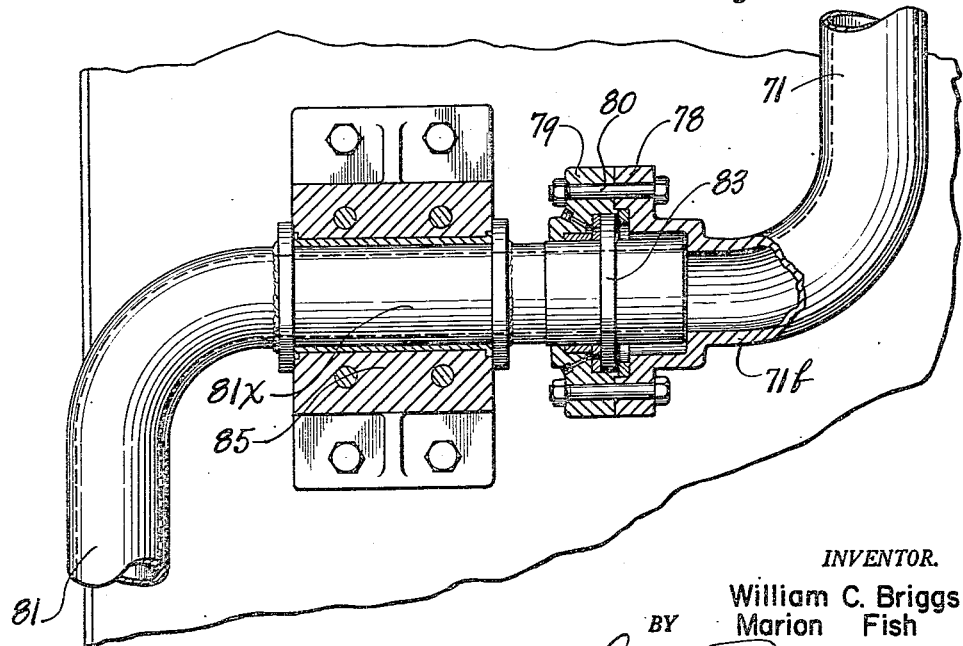
Fig. 6 is an enlarged horizontal section taken on line 6—6 in Fig. 3, particularly illustrating the manner of hingedly joining the pipe sections.

The preferred manner of making the hinged or pivotal connection between the joined sections of pipe is that shown in Fig. 6 wherein it is noted that the end portion of the transversely directed portion 81x of pipe 81, extends coaxially into the flanged end of the laterally turned end portion 71b of pipe 71 and is rotatably sealed therein. Also, it is shown that the rotatably contained end portion of the pipe 81 is equipped with an integral encircling band 83, serving as a thrust shoulder that is retained within the securing collar 79 thus to hold the parts against separation under the extreme hydraulic pressure to which the connection may be subjected in use. Suitable sealing gaskets are used in conjunction with the parts to prevent possible leakage. Other forms of swing joints could be used, if desired, but the construction shown in Fig. 6 has proved to be quite practical. The joints between the various connected pipes is like that of Fig. 6, and its description is intended to apply equally to all swing joints herein employed.

The pipe 81 through which the water supply connection is made with the carriage, has an end portion curved to extend at a right angle, and this is joined at its end with the laterally turned end of pipe 71. It is shown in Fig. 6 that this elbow portion 81x of pipe 81 is directed horizontally and transversely of the direction of travel of the carriage and is rotatably contained in a bearing 85 that is fixed to the carriage 10 as well shown in Figs. 2 and 11.

Water under pressure is brought to the location of the barker through a supply pipe 88, shown in Figs. 12 and 13 to be located substantially above and about medially of the limits of travel of the carriage along the trackway. This supply pipe 88 is directed horizontally and transversely of the direction of travel of the carriage and has a pipe section 89 swingingly suspended therefrom through the mediacy of a water tight connection designated at 90. The pipe 89, as observed in Fig. 12 can swing through a substantial arc, in a vertical plane lengthwise of the trackway, and it is swingingly connected at its lower end, as at 92, to the outer end of the pipe 81 providing for an elbow-like hinging action. This connection is like that shown in Fig. 6 for the joining of pipes 70 and 71 for a similar elbow action.

The length of pipes 81 and 89 is such that they will accommodate the full travel of the carriage for the barking operation; such travel, and pipe movement being illustrated in Fig. 12. For explanatory purposes and claiming, this water connection, comprised by the swingingly joined pipe 81 and 89 also is referred to as an articulated conduit.

The preferred form of nozzle head 40 is shown in Figs. 7 to 10 inclusive. In these views it is shown that the head has a base flange 90 secured by bolts 91 to a flange 92 on the lower end of pipe 37. The discharge passage 93 of the nozzle head terminates in a narrow, elongated horizontal outlet 94 over which a flat end plate 95 is fixed by a plurality of screw bolts 96 as well shown in Fig. 8. The plate is formed along its longitudinal center line with a row of small diameter ports 97 through which the water is discharged from the nozzle as closely located jets, forming a brush of such jets. By rotatably adjusting the nozzle body tube, the horizontal center lines of the nozzle head end plate 95 will be correspondingly rotated about a vertical axis, thus to cause the brush of water jets to contact the log in various ways, as may be best suited to the particular barking operation or problems.

The plate 95 may be readily removed for replacement by a plate with jet holes of different diameter or arrangement, to give more spread, greater concentration or a different treatment.

Assuming the parts of this apparatus to be so constructed and to be assembled as described, the nozzle can be adjusted vertically through the mediacy of the chain belts 42—42 to properly position the head 40 relative to the log that is to be barked. Furthermore, changes in its spaced relationship to the log can be made as need be as the carriage moves along the trackway. Also, the nozzle tube and head can be axially rotated by the motor 62 acting through the gears 64 and 60, to position the nozzle for the best results from the brush of water jets discharged therefrom.

The principal advantages gained by the use of water supply pipes and the present hinged connection of the pipes, reside in the elimination of the great expense and upkeep difficulties that are encountered by use of flexible hose connections, with their high cost of installation, maintenance and the frequent shut down operations for repair or replacement.

Furthermore, the present arrangement of articulated conduit, between source of supply of water and the carriage provides greater flexibility, easier travel and a longer life of equipment at lesser expense.

In the following claims, we use the term "articulated conduit" to designate the hingedly or swingingly joined pipe sections 70 and 71, also the same term to designate the sections 81 and 89. We use the term "nozzle supply pipe" to designate the pipe connection between the nozzle and the adjacent articulated section.

Having thus described my invention, what we claim as new therein, and desire to secure by Letters Patent, is:

1. In a hydraulic log barking apparatus of the character described, a carriage mounted for travel along and above a log, nozzle mounting and guide means fixed vertically on the carriage and a nozzle mounted thereby and comprising a vertical body tube with a nozzle head applied to the lower end thereof for the directing of water therefrom against a supported log; said body tube being supported for endwise adjustment by said mounting and guide means, and means on the carriage for effecting such adjustment, a water delivery conduit extended to and movable with the carriage and an articulated conduit comprising two rigid water conducting pipes with inner ends joined in communication to permit an elbow-like hinging action thereof, and having their outer ends swingingly joined in communication respectively, with said water delivery conduit and the upper end of said body tube of the nozzle.

2. In a hydraulic log barking apparatus as in claim 1, wherein the vertical guide means includes a bearing mounted by and movable along said guide means, and the body tube is supported for rotative adjustment in said bearing, and a power operated means is provided on the carriage for adjusting the said bearing vertically along said guide means and for securing the position of vertical adjustment.

3. Apparatus as in claim 2 wherein power means is mounted on the bearing for effecting rotary adjustment of the nozzle tube.

References Cited in the file of this patent
UNITED STATES PATENTS

| | | |
|---|---|---|
| 1,928,621 | Frede et al. | Oct. 3, 1933 |
| 2,395,845 | Bukowsky | Mar. 5, 1946 |
| 2,575,302 | Shaw | Nov. 13, 1951 |
| 2,587,473 | Holveck et al. | Feb. 26, 1952 |
| 2,600,625 | Ekholm et al. | June 17, 1952 |